(12) United States Patent
Daynes et al.

(10) Patent No.: US 8,191,826 B2
(45) Date of Patent: Jun. 5, 2012

(54) DEVICE WHICH IS SUBJECT TO FLUID FLOW

(75) Inventors: Stephen Daynes, Bristol (GB); Paul Weaver, Bristol (GB); Kevin Potter, Bristol (GB)

(73) Assignee: Westland Helicopters Limited, Somerset (GB)

( * ) Notice: Subject to any disclaimer, the term of this patent is extended or adjusted under 35 U.S.C. 154(b) by 59 days.

(21) Appl. No.: 12/706,829

(22) Filed: Feb. 17, 2010

(65) Prior Publication Data

US 2010/0213320 A1 Aug. 26, 2010

(30) Foreign Application Priority Data

Feb. 20, 2009 (GB) .................................... 0902914.1

(51) Int. Cl.
*B64C 3/38* (2006.01)
*B64C 5/10* (2006.01)
*B64C 9/00* (2006.01)
*B64C 13/00* (2006.01)

(52) U.S. Cl. ..... 244/99.8; 244/200; 244/219; 244/123.1

(58) Field of Classification Search .................. 244/200, 244/219, 99.8, 123.1, 213, 214, 215, 216, 244/217, 130; 416/229 R, 230, 23
See application file for complete search history.

(56) References Cited

U.S. PATENT DOCUMENTS

| 1,856,578 | A | * | 5/1932 | Miquel et al. ................. 244/219 |
| 6,168,379 | B1 | * | 1/2001 | Bauer ............................. 416/23 |
| 6,220,550 | B1 | * | 4/2001 | McKillip, Jr. ................. 244/215 |
| 6,345,792 | B2 | * | 2/2002 | Bilanin et al. ................. 244/215 |
| 6,942,455 | B2 | * | 9/2005 | Schmaling et al. ............. 416/23 |
| 7,251,323 | B2 | * | 7/2007 | Holtorf et al. ........... 379/433.13 |
| 7,321,185 | B2 | * | 1/2008 | Schultz ........................ 310/368 |
| 2001/0010348 | A1 | * | 8/2001 | Bilanin et al. ................. 244/215 |
| 2004/0266502 | A1 | * | 12/2004 | Holtorf et al. ............... 455/899 |

FOREIGN PATENT DOCUMENTS

GB 973 587 10/1964

OTHER PUBLICATIONS

UK Search Report for GB 0902914.1.

* cited by examiner

*Primary Examiner* — Timothy D Collins
*Assistant Examiner* — Michael A Fabula
(74) *Attorney, Agent, or Firm* — Stites & Harbison PLLC; Marvin Petry

(57) ABSTRACT

A device such as an aerofoil which in use is subject to fluid flow, includes an outer surface part the geometry of which is variable to affect the fluid flow, the device including a support structure which supports the outer surface part, the support structure being internal of the device and including a plurality of support members of composite material the geometry of the support structure being changeable by an actuating apparatus, between a first stable geometry and a second stable geometry to effect variation in the geometry of the outer surface part, the support members providing structure stiffness to the outer surface part.

15 Claims, 4 Drawing Sheets

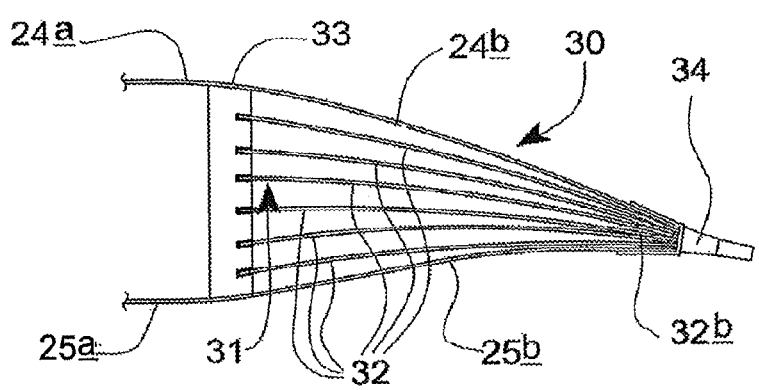
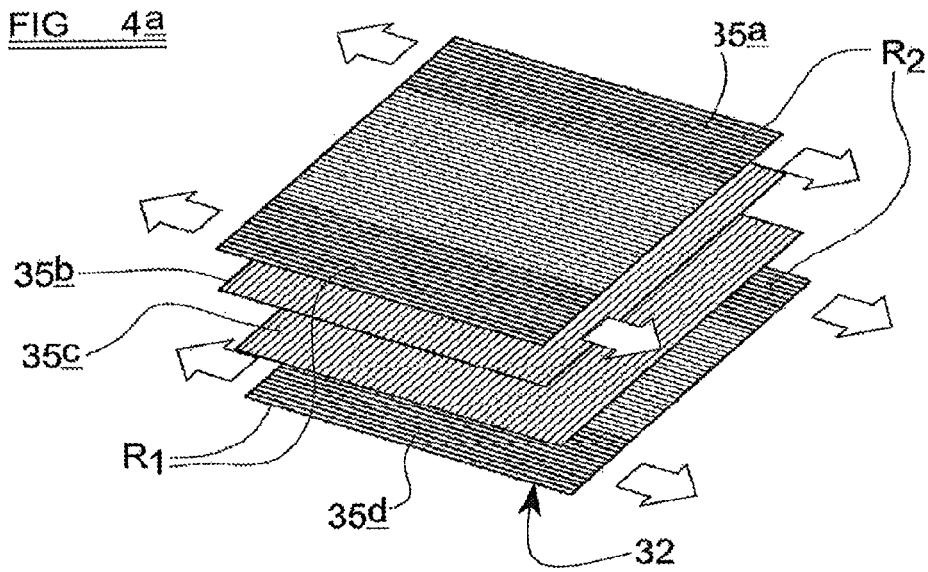
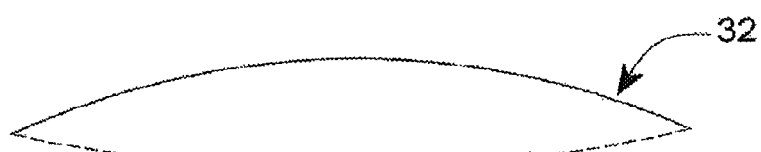

DEVICE WHICH IS SUBJECT TO FLUID FLOW

BACKGROUND TO THE INVENTION

This invention relates to a structure which in use is subject to fluid flow. More particularly but not exclusively the invention relates to an aerofoil device especially of an aircraft, such as a rotor blade of a rotary wing aircraft such as a helicopter, or a wing of a non-rotary wing aircraft.

However the invention has application to other aerofoil devices, such as for examples only, propellers and turbine blades, and yet more generally to any device which in use is subject to fluid flow and there is a requirement to vary the geometry of at least a part of the device in use, to affect fluid flow.

Rotor blades for example, have a main body with an outer surface including an upper camber surface and a lower camber surface, and a leading edge and a trailing edge, a blade tip and a root end. The trailing edge particularly of the blade may have attached to it, a control surface, such as for example only, a flap, the position of which is variable to affect fluid flow over the device, for example to improve the performance of the blade, during the transition between hover and forward flight. For example the flap may be lowered from its usual raised position when the helicopter is in forward flight, to a lowered position to improve performance in hover.

DESCRIPTION OF THE PRIOR ART

Aerofoil devices are known which have ailerons, trim tabs and flaps at the trailing edge of a main body of the aerofoil, which provide airflow control surfaces to vary the effective camber of the aerofoil. Typically such control surfaces are separate from a main aerofoil body and are moveable relative the main aerofoil body by one or more actuators, which when the control surface is moved to a desired position relative to the main aerofoil structure, serve to maintain the control surface in that position. An example of such a prior art aerofoil is illustrated in FIG. 2a. A main aerofoil device, indicated at 15, has at the trailing edge 22 thereof, a control surface i.e. a flap 30 which is pivoted to the main body 15a of the aerofoil structure 15, and is moveable up and down to change the effective camber of the aerofoil for different flight conditions. The control surface 30 is pivoted by an actuator which also serves to maintain the position of the control surface 30, and hence the effective camber, in a selected position.

It has been proposed to utilise for an aerofoil device control surface, bi-stable composite material for an outer surface part of the device. The geometry of such material may be changed between one stable geometry and another by some actuator. However hithertofore, such proposals have presented practical difficulties in achieving reliable changes between bi-stable geometries, whilst ensuring that the bi-stable outer surface part material is able to provide enough structural stiffness to withstand geometrical distortions due to dynamic fluid loads experienced in use as the fluid flows over the outer surface part.

SUMMARY OF THE INVENTION

According to a first aspect of the invention we provide a device which in use is subject to fluid flow. The device may include an outer surface part the geometry of which is variable to affect the fluid flow, and may include a support structure which supports the outer surface part. The support structure may include a member of composite material the geometry of which is changeable by an actuating apparatus between a first stable geometry and a second stable geometry to effect variation in the geometry of the outer surface part.

The present invention, by using the composite material with the bi-stable geometry for a support member of the internal support structure rather than outer surface part of the device, provides greater design flexibility both to ensure reliable changes in geometry between the first and second stable geometry of the composite material member and hence more reliable effecting of variation in the geometry of the outer surface part, whilst providing sufficient stiffness to the outer surface part to withstand geometrical distortions due to dynamic fluid loads experienced in use as the fluid flows over the outer surface part.

However the invention enjoys the advantage that the composite material member of the device maintains the first or second stable geometry without any influence from the actuating apparatus and when the geometry is changed to the second or first stable geometry respectively.

As the actuating apparatus used in the present invention is not required to maintain the geometry of the device, power is not required to maintain the geometry, and lighter apparatus may be provided which may require less components than conventional actuating apparatus.

This contrasts with conventional aerofoils, for example as shown in FIG. 2a, in which an actuator serves not only to vary the aerofoil geometry by moving a control surface, but to maintain the aerofoil geometry by holding the control surface in a selected position.

Although any actuating apparatus which is capable of changing the geometry of the composite material member may be used, such as a mechanical actuator, a piezoelectric actuated actuator, or an electrical actuator for examples only, in each case preferably the actuating apparatus effects changes between the first and second stable geometries by applying a mechanical force to a part of the composite material member.

In order to ensure that the support structure provides sufficient structural stiffness to the outer surface part to withstand geometrical distortions due to dynamic fluid loads experienced in use as the fluid flows over the outer surface part, the support structure is preferably internal of the device, and includes a plurality of support members of the composite material.

In one example the composite material of the or each support member is a laminated composite material including a plurality of laminate layers of fibres embedded in set matrix material, at least one of the laminate layers including a region of fibres which were stressed prior to the matrix material setting. The fibres of the laminate layers of the or each of the members of composite material, are preferably substantially aligned within that layer, and any fibres which are pre-stressed fibres in the or each member preferably extend in a common direction to establish a unidirectional stress field in the internal support structure.

By establishing a unidirectional stress field, the composite material member or members will, upon changing from one stable geometry to the other stable geometry, buckle rather than warp, so as to achieve maximum variation in the geometry of the outer surface part supported by the support structure.

Thus where there are a plurality of composite material members, the geometries of each of the members may be changed by an actuating apparatus force acting in a single direction, and the plurality of members together may provide the desired stiffness to the outer surface part.

The fibres of the composite material may be glass or carbon fibres, or other suitable fibres which may even not yet be developed, whilst the matrix material is preferably a material which is unaffected by hygrothermal changes which may be experienced in use, such as for example an epoxy resin.

The support structure for the outer surface part may include an anchor to which one end of the or each member of the composite material, is held. The anchor for the or each composite material member may be provided by a respective recess in a spar of the device, and one end of the composite material member or members may be secured in the or the respective recesses by any desired fixing means, such as for example a bonding agent.

Where the internal support structure includes a plurality of composite material members, the opposite ends of each member to the one ends held by the anchor, may be held together in a manner to permit of differential movement of the members at the opposite ends. As the opposite ends are not rigidly fixed relative to one another (like the one ends), the composite material members will not provide resistance to a change in geometry of others of the composite material members.

Where the or each composite material member includes fibres which are all substantially aligned with a unidirectional pre-stress field, the or each member may extend from the anchor in the direction of the stress field.

The invention has particularly but not exclusively been developed for an aerofoil device which includes a main body which has an upper camber surface and a lower camber surface, and a leading edge and a trailing edge. The upper and lower camber surfaces may be provided at least in part by respective upper and lower surface skins, at least one of the upper and lower surface skins extending continuously beyond the main body to provide at least a part of the outer surface part of the device.

When the outer surface part is supported by the internal support structure with one geometry, the respective extending upper and/or lower surface of the aerofoil device thus may have a first effective camber and when the outer surface part is supported with another geometry, the respective upper and/or lower surface of the aerofoil device may have a second alternative effective camber.

Unlike a conventional aerofoil device in which a control surface e.g. such as a flap, is pivoted to the main aerofoil body and is thus a separate component attached to the main body, using the present invention the upper and/or lower surface skin of the main body is an integral part of the control surface.

The skin will need to be sufficiently flexible to permit of the variations in the geometry of the outer surface part.

Desirably both of the upper and lower surface skins extend continuously beyond the main body each to provide respectively, an upper outer surface part and a lower outer surface part of the device, and the support structure is located at least in part between the upper outer surface part provided by the upper surface skin and the lower outer surface part provided by the lower surface skin.

In one proposal, the or each outer surface part which is supported by the support structure is at a trailing edge of the aerofoil device. The aerofoil device may be one of an aircraft wing and a rotor blade which extends substantially straight along its span, and the outer surface part or together the upper and lower outer surface parts, may provide a control surface being an aileron, trim tab, or flap.

The outer surface part or together the upper and lower outer surface parts, may thus extend along a span of the aerofoil.

In another example, the aerofoil device may be one of a turbine blade and a propeller which includes a twist along its span.

According to a second aspect of the invention we provide a method of operating an aircraft which includes a device of the first aspect of the invention which is an aerofoil device being one of an aircraft wing and a rotor blade which extends substantially straight along its span. The aerofoil may include a main body which has an upper camber surface and a lower camber surface, and a leading edge and a trailing edge and in which the upper and lower camber surfaces are provided at least in part by respective upper and lower surface skins. At least one of the upper and lower surface skins may extend continuously beyond the main body to provide at least a part of the outer surface part of the device. The method may include, in flight, effecting a variation in the geometry of the upper and lower outer surface parts of the aerofoil device, to affect air flow over the aerofoil device. This may be achieved by operating the actuating apparatus thereby to change the geometry of the member or members of composite material of the internal support structure which supports the upper and lower outer surface parts, from a first stable geometry to a second stable geometry.

Where the aerofoil device is a rotor blade of a rotary wing aircraft, the variation in the geometry of the upper and lower outer surface parts may be effected for different flight conditions; e.g. one geometry may be adapted for hover and another for forward flight; e.g. during the transition between hover and forward flight.

According to a third aspect of the invention we provide an aircraft having a device according to the first aspect of the invention, the device being one of a wing and rotor blade which extends substantially straight along its span.

BRIEF DESCRIPTION OF THE DRAWINGS

Embodiments of the invention will now be described with reference to the accompanying drawings in which:—

FIGS. 3a and 3b are illustrations showing the alternative positions of a control surface at a trailing edge of the structure of FIG. 2b achieved by an internal support structure with bi-stable members;

FIG. 4a illustrates a step in a method of pre-stressing a composite material;

FIG. 4b is a side illustration of a bi-stable member in two alternative stable states;

DESCRIPTION OF THE PREFERRED EMBODIMENTS

Figure 1:
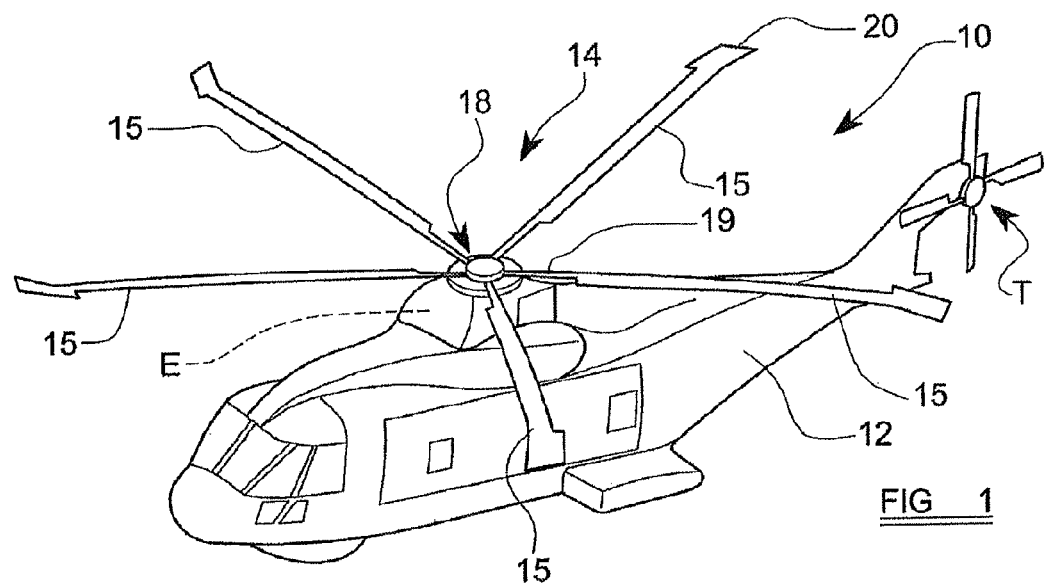
FIG. 1 is an illustrative perspective view of a rotary wing aircraft having a rotary wing device in accordance with the present invention.

Referring to FIG. 1, a rotary wing aircraft i.e. a helicopter 10 includes a body 12 housing a power source e.g. an engine E, for rotating a main sustaining rotor system 14 about a generally upright axis A, to generate lift and as desired to move the aircraft 10 though the air, or to permit the aircraft 10 to hover. The helicopter 10 of the example also includes a tail rotor system T.

Figure 2A:
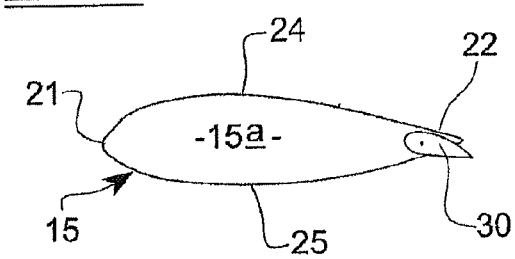
FIGS. 2a and 2b are illustrative cross sections through respectively, a rotary wing device of a prior art rotary wing device and a rotary wing device in accordance with the present invention.
Figure 2B:
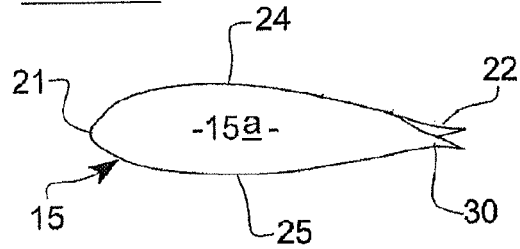

The main sustaining rotor system 14 in this example, includes five rotary wings or blades 15, one of which is illustrated in cross section in FIG. 2b. Each rotor blade 15 is an aerofoil device which is substantially straight along its span from a root end 19 where the blade 15 is connected to a rotary hub 18 which is rotated through a transmission by the aircraft engine E, to a blade tip 20.

Each blade 15 is an aerofoil device, including a leading edge 21 and a trailing edge 22, and the blade 15 generates lift as air flows chord wise over an upper camber surface 24 and a lower camber surface 25 between the leading and trailing edges 21, 22, as is well known in the art.

Conventionally, such aerofoil devices 15 include control surfaces which are moveable relative to a main rotor body 15a, to vary the geometry of the aerofoil device 15 and thus affect airflow over the aerofoil device 15. In FIG. 2a, such a conventional arrangement is illustrated in which at the trailing edge 22 of the rotor blade 15, a control surface separate to a main rotor blade body 15a, is provided, indicated at 30. The control surface 30 is moveable between raised and lowered positions by an actuator such as a motor, linear or rotary hydraulic actuator, or even a piezoelectric type of actuator, which is provided internally of the main rotor blade body 15a. Thus the geometry or effective camber of the blade 15 is varied by moving the control surface 30, although the actual geometries of the main rotor body 15a and of the control surface 30 themselves do not vary, only the relative position of the control surface 30 to the main rotor body 15a.

Such control surfaces 30 are moveable to affect airflow over the aerofoil device 15 to suit different flight conditions thus to optimise e.g. lift or speed as desired. The present invention has particularly been devised to facilitate the varying of the rotor 15 geometry in the transition when the helicopter 10 is changing between hover (when the control surface 30 may be lowered for maximum lift) and forward flight (when the control surface 30 may rise to minimise drag).

An aerofoil device 15 in accordance with the present invention is illustrated in FIG. 2b. In the figure it can be seen that the control surface 30 has a first lowered position and a second raised position. However the control surface 30 is not separate from a main rotor body 15a. Rather, the geometry of upper and lower outer surface parts of the control surface 30 is varied between the lowered and raised positions shown.

Figure 5:
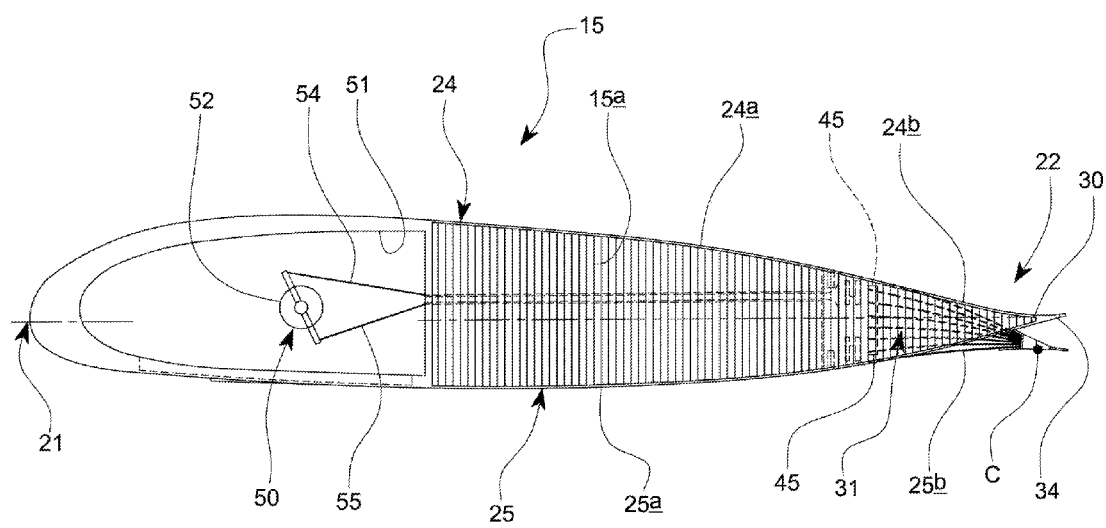
FIG. 5 is a more detailed sectional view, similar to FIG. 2b.

In FIG. 5 more detail of the aerofoil device 15 can be seen. The upper camber surface 24 of the aerofoil device 15 is provided by an upper surface skin 24a which, in this example, extends continuously from at or adjacent the leading edge 21 of the aerofoil device 15, to the trailing edge 22 and beyond to provide an upper outer surface part 24b of the control surface 30. The lower camber surface 25 of the aerofoil device 15 is provided by a lower surface skin 25a which also extends, in this example, continuously from at or adjacent the leading edge 21 of the aerofoil device 15, to the trailing edge 22 and beyond to provide a lower outer surface part 25b of the control surface 30.

Figure 6:
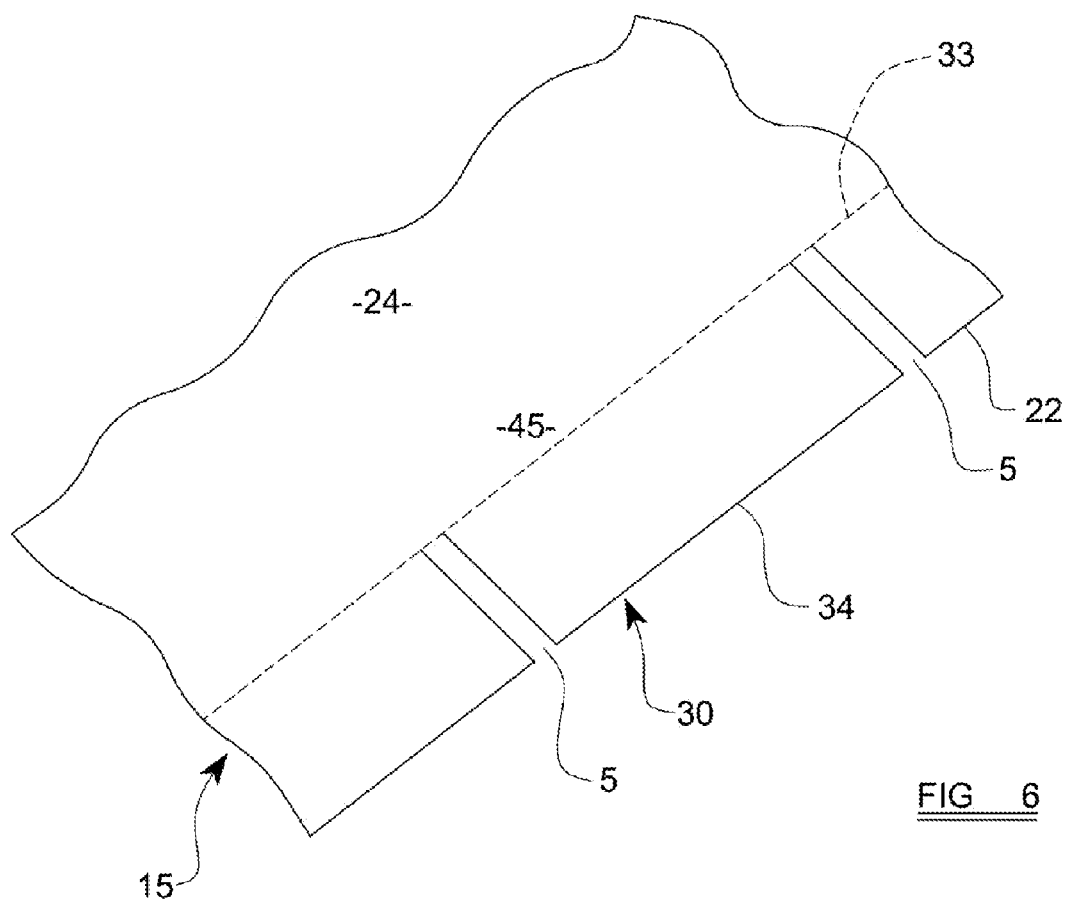
FIG. 6 is an illustrative plan view of part of the rotary wing of FIG. 5.

Of course to permit the control surface 30 to move between its raised and lowered positions, the upper and lower outer surface parts 24b, 25b will need to be separated from an adjacent control surface along the trailing edge 22, or the upper and lower skins 24, 25 which cover the adjacent main structure 15b, in the chord direction, as suggested in FIG. 6 at S.

Between the upper and lower outer surface parts 24b and 25b, there is an internal support structure 31 which supports the upper and lower outer surface parts 24b, 25b of the control surface 30, and which internal support structure 31 effects the variation in geometry of the upper and lower outer surface parts 24b, 25b between the raised and lowered positions of the control surface 30.

Figure 3A:
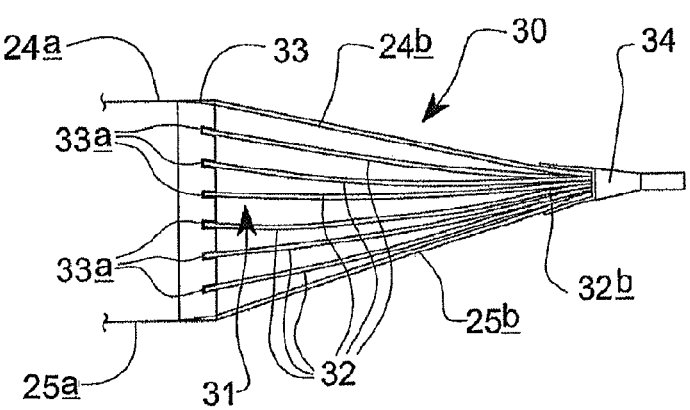

Referring also to FIGS. 3a and 3b it can be seen that internally within the control surface 30, the internal support structure 31 includes a plurality of support members 32. These support members 32 are each made of an intelligent responsive composite material, the internal support structure 31 in this example, including at least six such support members 32 each of which extends from one end, where the support members 32 are each fixed to an anchor of the support structure 31, provided by a respective recess 33a in a spar 33 of the main rotor body 15a, to an opposite end indicated at 32b. The spar 33 preferably extends for the full span length of the blade 15, but could be local only to the control surface 30 as required.

The one ends of the support members 32 may be retained in their respective recesses 33a of the spar 33 by any desired fixing device, or as in the example, the one ends may be bonded in the recesses 33a with a suitable bonding agent for example.

The control surface 30 includes in this example, a trailing edge member 34 which receives the opposite ends 32b of each of the support members 32 to the spar 33, in a manner as described below.

The bi-stable composite material of the support members 32 naturally and inherently adopt one of two bi-stable conditions, one of these being shown in FIG. 3a and the other in FIG. 3b.

Such composite materials themselves are generally known.

In the present example the members 32 are made from a plurality of laminated layers (see FIG. 4a) 35a, 35b, 35c, 35d, which are bonded together. Each layer 35a, 35b, 35c, 35d includes fibres, typically glass or carbon fibres, embedded in set matrix material, which in the present example is epoxy resin, but could be another suitable settable material which is unaffected by hygrothermal changes experienced in use.

It can be seen that the fibres in each of the layers 35a, 35b, 35c, 35d extend in a single direction within that layer. In the example, the fibres in the middle two layers 35b, 35c extend generally orthogonally to the fibres in the outer two layers 35a, 35d. Moreover, fibres in regions of the outer two layers 35a, 35d, in the example shown for illustrative purposes in FIG. 4a, opposite edge regions R1 and R2, are pre-stressed i.e. the fibres in these regions R1 and R2 were stressed lengthwise prior to being embedded in the set matrix material.

By pre-stressing the fibres in the outer layers 35a and 35d which extend in a common direction, this method of manufacture establishes a unidirectional stress field in the material. This unidirectional stress field, when the stress is released once the matrix material has set, results in the composite material member 32 adopting a cambered configuration e.g. as indicated in full lines in FIG. 4b. However the configuration of the composite material member 32 can be changed to the cambered configuration indicated in FIG. 4b by dotted lines, by applying an actuating (mechanical) force to the member 32, to cause buckling of the member. The unidirectional stress field ensures that the member 32 buckles as described along its length, rather than for example, warps, for example with a twist.

Each of the six support members 32 are arranged one on top of each other between the upper and lower outer surfaces 24b, 25b of the control surface 30, so that the members 32 extend from the spar 33 or other anchor to which their one ends are anchored, with their respective unidirectional stress fields aligned, i.e. the direction of the pre-stressed fibres aligned, to their opposite ends 32b to the trailing edge member 34.

End parts of the upper and lower outer surface parts 24b, 25b provided by the upper and lower surface skins 24, 25 of the aerofoil device 15, and the opposite ends 32b of the composite material members 32, are received by a channel of the trailing edge member 34. The trailing edge member 34 may be secured to the end parts of each of the upper and lower outer surface parts 24b, 25b e.g. by a bonding agent. The opposite ends 32b of each of the composite material members 32 may be held to each other where received by the trailing edge member 34, or may simply be retained by being trapped between the upper and lower outer surface parts 24b, 25b. If the opposite ends of the composite material members 32 are held to each other, differential movement or slipping between the opposite ends 32b of the members 32 in their extension directions, must be permitted, as the members 32 change geometry between the bi-stable configurations, i.e. between the FIG. 3a and FIG. 3b stable geometries.

This may be achieved using an elastic bonding agent, or some other holding means which permits such differential movement.

It will be appreciated that upon the composite material members 32 changing their geometries, this will effect a variation in geometry in each of the upper and lower outer surface parts 24b, 25b thus to vary the effective camber of the aerofoil device 15.

The control surface 30 needs to be moved i.e. the composite material members 32 need to be moved between their bi-stable geometries, by an actuating apparatus, but as the first and second geometries of the composite material members 32 are stable i.e. the material buckles between one geometry and the other and maintains that geometry until forced to buckle in the opposite direction, the actuating apparatus is not required to hold the control surface 30 in either of its raised or lowered positions.

As the control surface 30 is not separate from the main structure 19 but the control surface 30 is required to move between its raised and lowered positions as the composite material members 32 buckle between their bi-stable states, the upper and lower surface skins 24, 25, at least in the region where the control surface 30 is adjacent to the main body 15 of the aerofoil device 15, i.e. the region, referenced 45, needs to accommodate variations in geometry and thus the upper and lower surface skins 24, 25 in the region 45 need to be constructed to permit of moving of the control surface 30 between its upper and lower positions.

In another example, the material of one or other of the upper and lower outer surface parts 24b, 25b may be a composite material with bi-stable characteristics like the support members 32, but it is the provision of the support structure of members 32, internally of the control surface 30 which provides reliability for varying the geometry of the upper/lower outer surface parts 24b, 25b, and which provides the necessary stiffness to the upper/lower outer surface parts 24b, 25b to resist geometric distortion as the control surface 30 experiences dynamic fluid loads in use.

An example of a suitable actuating apparatus which may be provided to vary the geometry of the control surface 30 will now be described with reference to FIG. 5.

The main body 15a of the aerofoil device 15 (which in this example is a helicopter rotor blade 15) includes an internal honeycomb structure over most of its volume between the leading edge 21 and the trailing edge 22. In another aerofoil device, such as a fixed wing of the aircraft, the wing may accommodate fuel storage tanks and/or other equipment.

In the case of a rotor device 15 though, it is desirable that the rotor device 15 is balanced at a position about 25% of the chord length. Accordingly the actuating apparatus to be described and illustrated at 50, or at least the components of the apparatus 50 which contain the most weight, are accommodated towards the leading edge 21 of the rotor device 15, in a suitable hollow 51 distant chord-wise from the control surface 30, at a position so as not to compromise the balance of the rotor 15.

The actuating device 50 may include a motive unit 52 such as for examples only, an electric motor, a hydraulic or pneumatic fluid motor or actuator, or a piezoelectric device, and a pair of pulling elements, in the example, connecting flexible cables 54, 55. The flexible cables 54, 55 are each connected at one end to the motive device 52 such that either cable 54, 55 can selectively be pulled by appropriate operation of the motive unit 52. In another example, the pulling elements could be rigid or semi-rigid elements, or may be part rigid and part flexible along their lengths. Where rigid, the necessary force to change the members 32 from one stable state to another, may be applied by pushing instead of pulling.

One of the cables 54, an upper cable, extends via a first actuation path, towards the trailing edge 22 of the aerofoil device 15, and then the upper cable 54 is guided closely beneath the upper outer surface part 24b of the control surface 30. The other cable 55, a lower cable, similarly extends via a second actuation path, towards the trailing edge 22 of the aerofoil device 15, and then the lower cable 55 is guided closely above the lower outer surface part 25b of the control surface 30.

Each of the cables 54, 55 is connected to the trailing edge member 34 as indicated at C.

It will be appreciated that when the motive unit 52 is operated to pull the upper cable 54, a mechanical force will be imparted to each of the composite material members 32 and the stable geometry shown in FIG. 3a, with the control surface 30 in a raised condition, will be attained. By operating the motive unit 52 to pull the lower cable 55, a mechanical force will be imparted to each of the composite material members 32 and the other stable geometry shown in FIG. 3b, with the control surface 30 in a lowered position will be attained. Of course when pulling either cable 54, 55, with the motive unit 52, the other cable 55, 54 needs to be allowed to move so as not to resist the change in geometry of the support members 32.

The actuating apparatus 50 may be operated by a controller which may be automatically responsive to helicopter 12 operating conditions, and/or to pilot/operator control, to operate the actuating apparatus 50 to effect a change in control surface 30 position between the raised and lowered positions by moving the support members 32 between their first and second stable geometries.

Many modifications may be made without departing from the scope of the invention. For example the configuration of the internal support structure 31 as shown in FIGS. 3a, 3b and FIG. 5 is purely illustrative and exemplary. Any number of support members 32 necessary to effect a variation in the geometry of the upper and lower outer surface parts 24b, 25b of the control surface 30 may be provided, and these may be of different length and configuration to the members 32 shown and described. Also, any appropriate number of members 32 may be selected to achieve the necessary stiffness of the upper and lower outer surface parts 24b, 25b to resist geometrical distortion when experiencing dynamic fluid loads, which could otherwise effect an undesirable change of geometry of the support members 32 other than under or controller pilot control.

As can be seen from FIG. 6, the control surface 30 extends along part of the span of the blade 15. Where the span extent of the control surface 30 is long, the actuating apparatus 50 may have more than one upper and lower cable 54, 55 or other pulling members along the span, to apply the necessary forces to the supporting structure to effect the variation in geometry of the upper and lower outer surface parts 24b, 25b of the control surface 30 along its entire length.

Where the span extent of the control surface 30 is small, so that the control surface is a tab e.g. as suggested in FIG. 6, a plurality of independently actuable such tabs along the span length, which lengths are separated by gaps 5, each having a variable geometry in accordance with the invention, may be utilised.

The invention has been described particularly in relation to varying the geometry of upper and lower outer surface parts 24b, 25b of a control surface 30 at a trailing edge 22 of a helicopter rotor blade 15, but as will be understood from the introduction to this specification, the invention has much wider application including to control surfaces at a leading edge 21 of an aerofoil 15, and generally to a wing of an aerofoil of a non-rotary wing aircraft such as a fixed wing. The aircraft may be operated by a pilot or may be an un-manned aircraft.

The aerofoil need not be a wing 15, but could be a rotor blade of the tail rotor system T of the helicopter 15, or could be any other aerofoil or other device over which fluid flows in use, such as a propeller or turbine blade.

Instead of providing a trailing edge member 34, or in addition, if desired the aerofoil outer surface skin 24, 25 may extend around the support structure 31, or the opposite ends 32b of the composite material support members 32 may be un-enclosed at the trailing edge 22 of the aerofoil 15 by any skin or trailing edge member 34.

For further example the invention may be utilised to change the configuration of a surface part of an air intake or exhaust, or of an air flow cowling. The invention may be utilised for a device which is a fairing of a vehicle, e.g. a lorry tractor unit, to vary the geometry of an outer surface part of the fairing using a support structure having one or more composite material members the geometry of which can be changed between bi-stable states for optimum performance depending upon whether the tractor unit is towing a trailer or not.

Thus whereas in the example described in which the invention is applied to a control surface 30 having both an upper outer surface part 24b and a lower outer surface part 25b, the invention may be applied to a device which has only a single outer surface part.

The invention is applicable not only to single main sustaining rotor helicopters such as shown in FIG. 1, but tandem sustaining rotor helicopters too.

The invention claimed is:

1. A device which in use is subject to fluid flow, the device including an outer surface part the geometry of which is variable to affect the fluid flow, the device including a support structure which supports the outer surface part, the support structure being internal of the device and including a plurality of support members of composite material, the geometry of the support structure being changeable by an actuating apparatus, between a first stable geometry and a second stable geometry to effect variation in the geometry of the outer surface part, the support members providing structural stiffness to the outer surface part.

2. A device according to claim 1 wherein the composite material of the structure maintains the first or second stable geometry without any influence from the actuator apparatus when the geometry is changed to the second or first stable geometry respectively.

3. A device according to claim 1 wherein the actuating apparatus effects changes between the first and second stable geometries by applying a mechanical force to a part of each composite material support member.

4. A device according to claim 1 wherein the composite material of the support member is a laminated composite material including a plurality of laminate layers of fibres embedded in set matrix material, at least one of the laminate layers including a region of fibres which were stressed prior to the matrix material setting.

5. A device according to claim 4 wherein the fibres of the laminate layers of each of the support members of composite material are substantially aligned within that layer, and any fibres which are pre-stressed fibres in each member extend in a common direction and establish a unidirectional stress field in the internal support structure.

6. A device according to claim 4 wherein the fibres are one of glass and carbon fibres and the matrix material is a material which is unaffected by hygrothermal changes.

7. A device according to claim 1 wherein the support structure of the outer surface part includes an anchor to which one end of each member of the composite material, is held, the opposites ends of each support member being held together in a manner to permit of differential movement of the members at the opposite ends.

8. A device according to claim 5 wherein the support structure of the outer surface part includes an anchor to which one end of each member of the composite material, is held, the opposites ends of each support member being held together in a manner to permit of differential movement of the members at the opposite ends and wherein each support member extends from the anchor in the direction of the unidirectional stress field.

9. A device according to claim 1 wherein the device is an aerofoil device, including a main body which has an upper camber surface and a lower camber surface, and a leading edge and a trailing edge, and the upper and lower camber surfaces are provided at least in part by respective upper and lower surface skins, at least one of the upper and lower surface skins extending continuously beyond the main body to provide at least a part of the outer surface part of the device.

10. A device according to claim 9 wherein both of the upper and lower surface skins extend continuously beyond the main body each to provide respectively, an upper outer surface part and a lower outer surface part of the device, and the support structure is located at least in part between the upper outer surface part provided by the upper surface skin and the lower outer surface part provided by the lower skin.

11. A device according to claim 9 wherein the or each outer surface part which is supported by the support structure is at a trailing edge of the aerofoil device.

12. A device according to claim 9 which is one of an aircraft wing and a rotor blade which extends substantially straight along its span, the outer surface part or together the upper and lower outer surface parts, providing a control surface being one of an aileron, a trim tab, and a flap, which extend along a part of a span of the aerofoil.

13. A method of operating an aircraft which includes an aerofoil device according to claim 12, the method including, in flight, effecting a variation in the geometry of the upper and lower outer surface parts of the aerofoil device, to affect air flow over the aerofoil device, by operating the actuating apparatus thereby to change the geometry of the support members of composite material of the internal support structure which supports the upper and lower outer surface parts, from a first stable geometry to a second stable geometry.

14. A method according to claim 13 wherein the aerofoil device is a rotor blade of a rotary wing aircraft, and the variation in the geometry of the upper and lower outer surface parts is effected so that one geometry is adopted for hover and another for forward flight.

15. An aircraft having a device according to claim 1, the device being one of a wing and a rotor blade which extends substantially straight along its span.

* * * * *

UNITED STATES PATENT AND TRADEMARK OFFICE
CERTIFICATE OF CORRECTION

| | | |
|---|---|---|
| PATENT NO. | : 8,191,826 B2 | Page 1 of 2 |
| APPLICATION NO. | : 12/706829 | |
| DATED | : June 5, 2012 | |
| INVENTOR(S) | : Stephen Daynes et al. | |

It is certified that error appears in the above-identified patent and that said Letters Patent is hereby corrected as shown below:

In the Claims

Column 9, line 44, cancel the text beginning with "1 A device" to and ending "surface part" in column 9, line 54, and insert the following claim:

-- 1. A device which in use is subject to fluid flow, the device including an outer surface part, the geometry of which is variable to affect the fluid flow, the device including a support structure which supports the outer surface part, the support structure being internal of the device and including a plurality of support members of composite material, which support members are arranged one on top of each other, the geometry of the support structure being changeable by an actuating apparatus between a first stable geometry and a second stable geometry to effect variation in the geometry of the outer surface part, each said support member extending from one end to an opposite end, the said opposite ends being moveable within and relative to the outer surface part to permit differential movement of the support members, the support member providing structural stiffness to the outer surface part. --

Column 10, line 12, cancel the text beginning with "7. A device" to and ending "opposite ends."
In column 10, line 17, and insert the following claim:

-- 7. A device according to claim 1 wherein the support structure of the outer surface part includes an anchor to which said one end of each member of the composite material is held, the opposites ends of the support members being held together in a manner to permit the said differential movement. --

<p style="text-align:center">Signed and Sealed this<br/>Thirtieth Day of September, 2014</p>

<p style="text-align:center">Michelle K. Lee<br/><i>Deputy Director of the United States Patent and Trademark Office</i></p>

CERTIFICATE OF CORRECTION (continued)
U.S. Pat. No. 8,191,826 B2

Column 10, line 18, cancel the text beginning with "8. A device" to and ending "stress field." In column 10, line 25, and insert the following claim:

-- 8. A device according to claim 5 wherein the support structure of the outer surface part includes an anchor to which said one end of each member of the composite material is held, the opposites ends of the support members being held together in a manner to permit the said differential movement and wherein each support member extends from the anchor in the direction of the unidirectional stress field. --